(12) United States Patent
Matsueda

(10) Patent No.: US 9,804,437 B2
(45) Date of Patent: Oct. 31, 2017

(54) LIQUID CRYSTAL DISPLAY COMPRISING AN OPTICAL MEMBER HAVING A CHAMFERED PORTION AND METHOD FOR MANUFACTURING THE SAME

(71) Applicant: Mitsubishi Electric Corporation, Tokyo (JP)

(72) Inventor: Hironori Matsueda, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/982,409

(22) Filed: Dec. 29, 2015

(65) Prior Publication Data
US 2016/0195763 A1  Jul. 7, 2016

(30) Foreign Application Priority Data
Jan. 7, 2015 (JP) ................. 2015-001250

(51) Int. Cl.
  *G02F 1/1335*  (2006.01)
  *G02F 1/13*    (2006.01)

(52) U.S. Cl.
  CPC ...... *G02F 1/133528* (2013.01); *G02F 1/1303* (2013.01)

(58) Field of Classification Search
  CPC .................................................. G02F 1/1303
  See application file for complete search history.

(56) References Cited

U.S. PATENT DOCUMENTS

| | | | |
|---|---|---|---|
| 6,512,557 B1* | 1/2003 | Miwa ............... | G02B 6/0088 349/58 |
| 2009/0303413 A1* | 12/2009 | Ohta ................. | G02B 5/045 349/62 |
| 2011/0019296 A1* | 1/2011 | Yamamoto ......... | G02B 5/282 359/885 |
| 2014/0176868 A1* | 6/2014 | Zhu .................. | B29D 11/00663 349/65 |

FOREIGN PATENT DOCUMENTS

JP  2010-113109 A  5/2010

* cited by examiner

*Primary Examiner* — Paul Lee
(74) *Attorney, Agent, or Firm* — Studebaker & Brackett PC

(57) ABSTRACT

A polarizing plate has a corner portion subjected to chamfering so as to form a chamfered portion. A rotation angle of the polarizing plate is adjusted, and the polarizing plate is then bonded to a liquid crystal panel. Chamfering of the polarizing plate is, for example, C chamfering in which a chamfered shape is linear, the chamfered shape satisfying a specific expression and having a predetermined angle α. The chamfering may be R chamfering in which a chamfered shape is curved.

11 Claims, 12 Drawing Sheets

F I G. 6
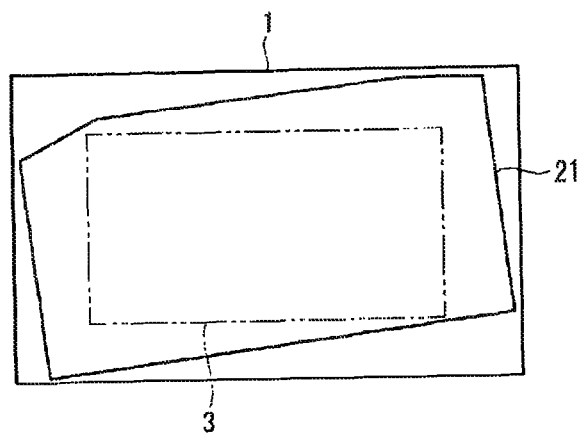
F I G. 7
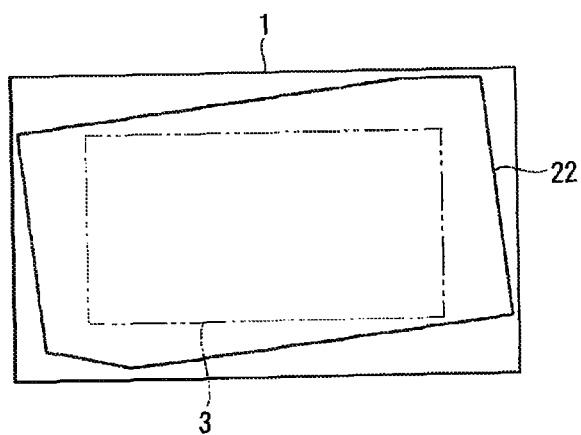

F I G. 10
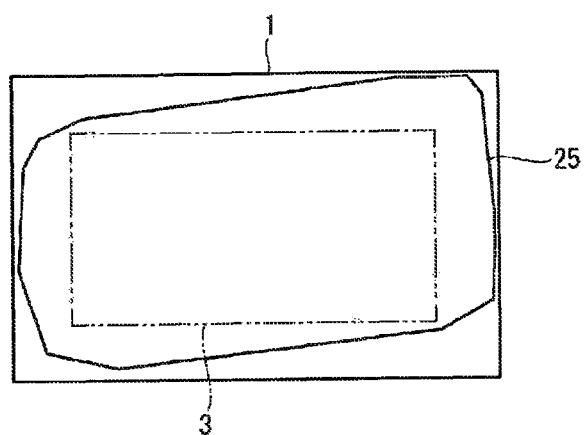
F I G. 11
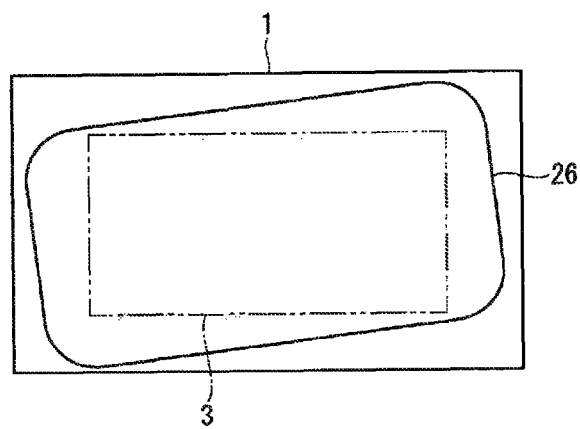

LIQUID CRYSTAL DISPLAY COMPRISING AN OPTICAL MEMBER HAVING A CHAMFERED PORTION AND METHOD FOR MANUFACTURING THE SAME

BACKGROUND OF THE INVENTION

Field of the Invention

The present invention relates to a liquid crystal display and a method for manufacturing the liquid crystal display.

Description of the Background Art

Liquid crystal displays each include a liquid crystal panel in which a pair of substrates sandwich liquid crystals therebetween, the substrates including an array substrate (hereinafter referred to as a "TFT array substrate" in some cases) and a counter substrate (hereinafter referred to as a "CF substrate" in some cases). The array substrate includes thin film transistors (TFT) as switching elements and pixel electrodes, and the counter substrate includes a color filter for color display.

Polarizing plates are bonded to external surfaces of the liquid crystal panel, namely, external surfaces of the TFT array and the CF substrate. In a polarizing plate bonding step of bonding the polarizing plates, the polarizing plates are bonded to the liquid crystal panel, for example, by mechanical aligning with respect to the outer shapes of the polarizing plates or by camera aligning with respect to the corner portions of the polarizing plates read by the camera.

The polarizing plate bonding step is premised on that optical axes such as absorption axes of the polarizing plates and a slow axis of a phase difference film fall within the range of a design tolerance to the outer shapes of the polarizing plates.

However, in a case where the optical axes such as the absorption axes of the polarizing plates and the slow axis of the phase difference film do not fall within the range of the design tolerance to the outer shape, desired optical properties cannot be obtained.

Even in this case, high quality products can be manufactured if the polarizing plates are bonded such that the optical axes, for example, the absorption axes of the polarizing plates and the slow axis of the phase difference film, coincide with an alignment axis of the liquid crystals in the polarizing plate bonding step described above. In other words, the polarizing plates are preferably bonded with reference to the optical axes such as the absorption axes of the polarizing plates and the slow axis of the phase difference film.

However, an allowable tolerance of bonding positions of the polarizing plates is limited in the current circumstances in which narrow frames of liquid crystal displays are required, so that an angle allowing for rotations of the polarizing plates cannot be sufficiently obtained. Therefore, if priority is given to matching the rotation angle of the polarizing plates with an angle at which the optical axes coincide with the alignment axis of the liquid crystals, the polarizing plates protrude from the outer shape of the liquid crystal panel.

A technology to solve the problems is disclosed in Japanese Patent Application Laid-Open No. 2010-113109, for example. The technology disclosed in Japanese Patent Application Laid-Open No. 2010-113109 measures amounts of deviations of the optical axes of the polarizing plates, sorts them out, and corrects each group. In the case where the polarizing plates protrude from the outer of the liquid crystal panel, the protrusions of the polarizing plates from the outer shape of the liquid crystal panel are cut.

The technology disclosed in Japanese Patent Application Laid-Open No. 2010-113109 cuts the protrusions of the polarizing plates from the outer shape of the liquid crystal panel in the case where the polarizing plates protrude from the outer shape of the liquid crystal panel, but the protrusions of the polarizing plates from the outer shape of the liquid crystal panel are hardly cut after the polarizing plates are bonded to the liquid crystal panel.

To solve the problems, portions of the polarizing plates (hereinafter referred to as "potential protruding portions" in some cases) that are expected to protrude from the outer shape of the liquid crystal panel are conceivably cut in advance, but this case causes the problems below.

The polarizing plates are laminated on separators, so that the optical axes are hardly measured with accuracy. To accurately measure the optical axes, the separators need to be removed from the polarizing plates to measure the optical axes, and then the potential protruding portions of the polarizing plates need to be cut in advance. However, the polarizing plates that have once been processed into rectangle are additionally subjected to a cutting process, thereby increasing manufacturing steps and reducing production efficiency.

For the addition of the cutting process after the separators are removed or after the polarizing plates are bonded to the liquid crystal panel as described above, the problem in which the finishing touches are hardly applied to cut surfaces of the polarizing plates also arises.

SUMMARY OF THE INVENTION

It is an object of the present invention to provide a liquid crystal display that suppresses a protrusion of an optical member such as a polarizing plate from an outer shape of a liquid crystal panel and has relatively small variations in quality, and to provide a method for manufacturing a liquid crystal display capable of manufacturing the liquid crystal display with relatively high yields.

A liquid crystal display of the present invention includes a liquid crystal panel and an optical member. The liquid crystal panel has a rectangular shape when seen from one side in a thickness direction. The optical member has a rectangular shape and has an optical axis. The optical member is bonded to a surface on the one side or the other side in the thickness direction of the liquid crystal panel.

The optical member has a chamfered portion subjected to chamfering. The chamfering is C chamfering in which a chamfered shape of the chamfered portion is linear.

The chamfered shape is defined by x and y that satisfy relationships of $z = a \cdot \cos\theta_1 + b \cdot \sin\theta_1 - A_0 > 0$, $x = z/\sin\theta_1 = (a \cdot \cos\theta_1 + b \cdot \sin\theta_1 - A_0)/\sin\theta_1$, and $y = z/\cos\theta_1 = (a \cdot \cos\theta_1 + b \cdot \sin\theta_1 - A_0)/\cos\theta_1$.

In the expressions, z represents an amount of protrusion of the optical member that is not chamfered from a bonded object. a represents half (½) a length of a short side of an outer shape of the optical member. b represents half (½) a length of a long side of the outer shape of the optical member. $\theta_1$ represents a rotation angle of the optical member, $A_0$ represents half (½) a length of a short side of an outer shape of the bonded object. x represents a chamfer length of the long side of the outer shape of the optical member. y represents a chamfer length of the short side of the outer shape of the optical member.

The optical member has the chamfered portion subjected to the chamfering in which the chamfered shape is defined by x and y satisfying the relationships of the expressions described above. This suppresses the protrusion of the optical member from the outer shape of the liquid crystal panel, and the liquid crystal display having the relatively small variations in quality can be obtained.

A liquid crystal display of the present invention includes a liquid crystal panel and an optical member. The liquid crystal panel has a rectangular shape when seen from one side in a thickness direction. The optical member has a rectangular shape and has an optical axis. The optical member is bonded to a surface on the one side or the other side in the thickness direction of the liquid crystal panel.

The optical member has a chamfered portion subjected to chamfering. The chamfering is R chamfering in which a chamfered shape of the chamfered portion is curved.

The optical member has the chamfered portion subjected to the R chamfering in which the chamfered shape is curved. This suppresses the protrusion of the optical member from the outer shape of the liquid crystal panel, and the liquid crystal display having the relatively small variations in quality can be obtained.

A method for manufacturing a liquid crystal display of the present invention includes a method for manufacturing the liquid crystal display of the present invention. The method for manufacturing the liquid crystal display of the present invention includes the steps (a) to (c) below.

The step (a) prepares the optical member.

The step (b) assesses or measures the optical axis of the optical member.

The step (c) adjusts the rotation angle θ1 of the optical member based on information about the optical axis after the assessment or the measurement and bonds the optical member to the liquid crystal panel.

The optical member is prepared, and the optical axis of the optical member is assessed or measured. The optical member is subjected to the chamfering in which the chamfered shape is defined by x and y satisfying the relationships of the expressions described above or the chamfered shape is curved by the R chamfering. The rotation angle θ1 of the optical member is adjusted based on the information about the optical axis after the assessment or the measurement, and the optical member is bonded to the liquid crystal panel. Thus, the liquid crystal display that suppresses the protrusion of the optical member from the outer shape of the liquid crystal panel and has the relatively small variations in quality can be manufactured with the relatively high yields.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows an example of a state in which a polarizing plate 21 is bonded to a liquid crystal panel 1 in a polarizing plate bonding step in a method for manufacturing a liquid crystal display in a second preferred embodiment of the present invention;

FIG. 7 shows an example of a state in which a polarizing plate is bonded to a liquid crystal panel 1 in a polarizing plate bonding step in a method for manufacturing a liquid crystal display in a third preferred embodiment of the present invention;

FIG. 10 shows an example of a state in which a polarizing plate 25 is bonded to a liquid crystal panel 1 in a polarizing plate bonding step in a method for manufacturing a liquid crystal display in a sixth preferred embodiment of the present invention;

FIG. 11 shows an example of a state in which a polarizing plate 26 is bonded to a liquid crystal panel 1 in a polarizing plate bonding step in a method for manufacturing a liquid crystal display in a seventh preferred embodiment of the present invention;

DESCRIPTION OF THE PREFERRED EMBODIMENTS

<Underlying Technology>

Figure 18:
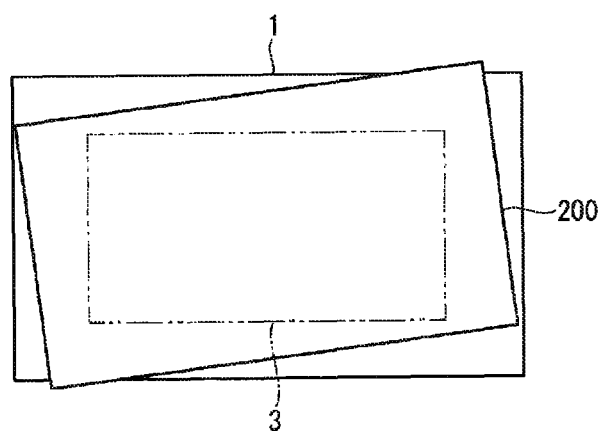
FIG. 18 shows an example of a state in which a polarizing plate 200 is bonded to a liquid crystal panel 1 in a polarizing plate bonding step in a method for manufacturing a liquid crystal display in an underlying technology.

FIG. 18 shows an example of a state in which a polarizing plate 200 is bonded to a liquid crystal panel 1 in a polarizing plate bonding step in a method for manufacturing a liquid crystal display in an underlying technology. In FIG. 18, a display region is denoted by a reference numeral "3."

As shown in FIG. 18, if priority is given to matching a rotation angle of the polarizing plate 200 with an angle at which an optical axis coincides with an alignment axis of liquid crystals, the polarizing plate 200 protrudes from the outer shape of the liquid crystal panel 1.

To solve this problem, the polarizing plate 200 protruding from the outer shape of the liquid crystal panel 1 is conceivably cut, for example, but the protrusion of the polarizing plate 200 from the outer shape of the liquid crystal panel 1 is hardly cut after the polarizing plate 200 is bonded to the liquid crystal panel 1.

Moreover, a potential protruding portion of the polarizing plate 200 that is expected to protrude from the outer shape of the liquid crystal panel 1 is also conceivably cut in advance, but this case causes the problems below.

The polarizing plate 200 is laminated on a separator, which is not shown, so that the optical axis is hardly measured with accuracy. To accurately measure the optical axis, the separator needs to be removed from the polarizing plate 200 to measure the optical axis, and then the potential protruding portion of the polarizing plate 200 needs to be cut in advance. However, the polarizing plate 200 that has once been processed into rectangle is additionally subjected to a cutting process, thereby increasing manufacturing steps and reducing production efficiency.

For the addition of the cutting process after the separator is removed or after the polarizing plate 200 is bonded to the liquid crystal panel 1 as described above, the problem in which the finishing touches are hardly applied to cut surfaces of the polarizing plate 200 also arises. To solve the problems above, the present invention includes a configuration of each embodiment below.

First Preferred Embodiment

Figure 1:
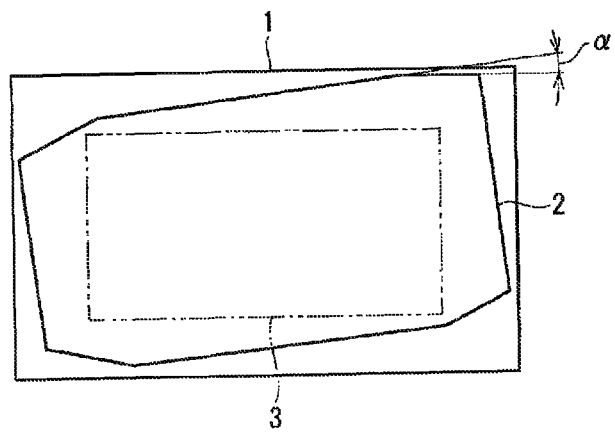
FIG. 1 shows an example of a state in which a polarizing plate 2 is bonded to a liquid crystal panel 1 in a polarizing plate bonding step in a method for manufacturing a liquid crystal display in a first preferred embodiment of the present invention.

FIG. 1 shows an example of a state in which a polarizing plate 2 is bonded to a liquid crystal panel 1 in a polarizing plate bonding step in a method for manufacturing a liquid crystal display in a first preferred embodiment of the present invention. FIG. 1 shows the liquid crystal panel 1 and the polarizing plate 2 that have a rectangular shape.

In this preferred embodiment, before the polarizing plate 2 is bonded to the liquid crystal panel 1, the corner portions of the polarizing plate 2 are chamfered at a predetermined angle α, to thereby form chamfered portions. Consequently, an absorption axis of the polarizing plate 2 can coincide with an alignment axis of liquid crystals without the protrusion of the polarizing plate 2 from the outer shape of the liquid crystal panel 1, and thus desired optical properties can be obtained.

To identify the inside, the outside, and directions of the polarizing plate 2, the corner portions of the polarizing plate 2 may be chamfered in sonic cases. In this case, the chamfered shape has C of approximately 0.5 to 1.5 or R of approximately 0.5 to 1.5, for example, and the corner portions of the polarizing plate 2 are only slightly processed.

In contrast, this preferred embodiment performs chamfering for the purpose different from the purpose of identifying the inside, the outside, and the directions of the polarizing plate 2. Thus, an amount of chamfering is increased more than that in chamfering for identifying the inside, the outside, and the directions of the polarizing plate 2.

Limiting conditions for the chamfer angle of the polarizing plate 2 include that the polarizing plate 2 should not protrude from the outer shape of the liquid crystal panel 1 (hereinafter referred to as a "first limiting condition" in some cases) and that the polarizing plate 2 should be able to cover a region needed to be covered (hereinafter referred to as a "second limiting condition" in some cases). The region needed to be covered by the polarizing plate 2 includes, for example, a display region 3 or an opening region formed in a housing correspondingly to the display region 3.

Figure 2:
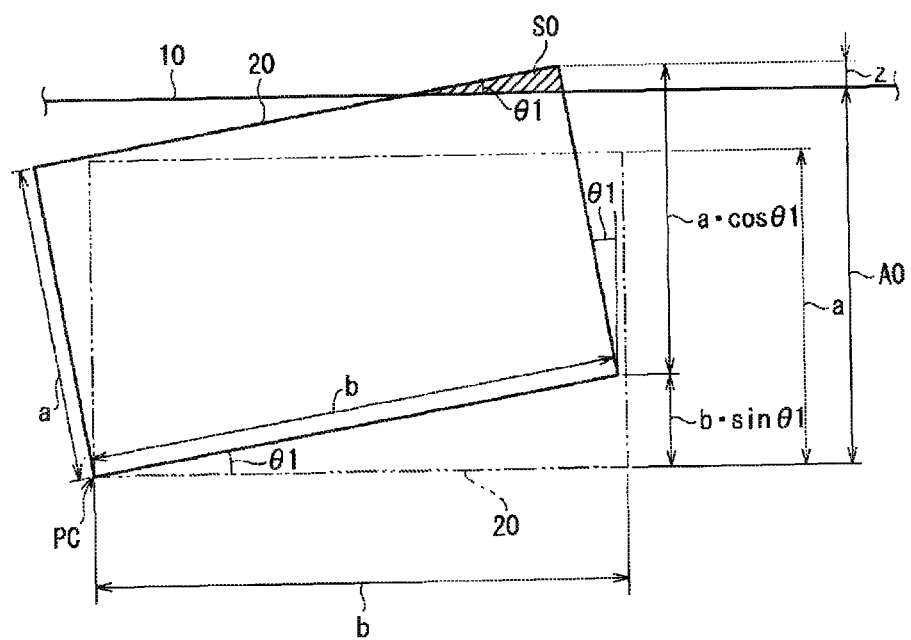
FIG. 2 is a diagram for describing a means of calculating a chamfer angle of a polarizing plate on the basis of a first limiting condition.
Figure 3:
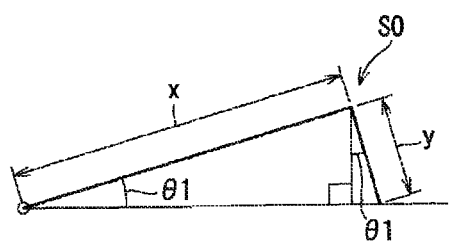
FIG. 3 is an enlarged view of a protruding portion S0 of the polarizing plate 2 from the outer shape of the liquid crystal panel 1 shown in FIG. 2.

FIG. 2 is a diagram for describing a means of calculating the chamfer angle of the polarizing plate on the basis of the first limiting condition. FIG. 2 shows the outer shape of the liquid crystal panel 1 shown in FIG. 1, specifically, a short side of the outer shape of the liquid crystal panel 1 with a reference numeral "10." FIG. 2 shows the outer shape of the polarizing plate 2, specifically, one-fourth a portion of the outer shape of the polarizing plate 2 with a reference numeral "20." FIG. 2 shows a panel center being the center of the liquid crystal panel 1 with a reference numeral "PC." FIG. 3 is an enlarged view of a protruding portion S0 of the polarizing plate 2 from the outer shape of the liquid crystal panel 1 shown in FIG. 2.

An amount of chamfering of the polarizing plate 2 is expressed by an expression (2) and an expression (3) below on the premise that a rotation angle $\theta 1$ of the polarizing plate 2 satisfies an expression (1) below, which is a condition for causing a protruding portion of the polarizing plate 2 remaining in rectangle.

$$z = a \cdot \cos \theta 1 + b \cdot \sin \theta 1 - A0 > 0 \tag{1}$$

$$x = z/\sin \theta 1 = (a \cdot \cos \theta 1 + b \cdot \sin \theta 1 - A0)/\sin \theta 1 \tag{2}$$

$$y = z/\cos \theta 1 = (a \cdot \cos \theta 1 + b \cdot \sin \theta 1 - A0)/\cos \theta 1 \tag{3}$$

In the expression (1), z represents an amount of protrusion of the polarizing plate 2 that is not chamfered. In the expression (2) and the expression (3), a represents half (½) a length of the short side of the outer shape 20 of the polarizing plate 2, b represents half (½) a length of the long side of the outer shape 20 of the polarizing plate 2, $\theta 1$ represents the rotation angle of the polarizing plate 2, A0 represents half (½) a length of the short side of the outer shape 10 of the liquid crystal panel 1, x represents a chamfer length of the long side of the outer shape 20 of the polarizing plate 2, and y represents a chamfer length of the short side of the outer shape 20 of the polarizing plate 2. In the following descriptions, half (½) a length of the long side of the outer shape 10 of the liquid crystal panel 1 is shown with a reference numeral "B."

On the basis of the expression (2) and the expression (3) above, the chamfer length x of the long side of the outer shape 20 of the polarizing plate 2 and the chamfer length y of the short side of the outer shape 20 of the polarizing plate 2 are determined by the predetermined rotation angle $\theta 1$, so that a shape for appropriate chamfering can be selected such that the outer shape 20 of the polarizing plate 2 does not protrude from the outer shape 10 of the liquid crystal panel 1.

The predetermined rotation angle $\theta 1$ is preferably set to, for example, a maximum axis deviation angle being assumed, or a maximum axis deviation angle in a range of manufacturing variations in axis deviation angle or in an allowable range of an acceptance inspection. Considerations need to be given to data on the range of manufacturing variations in the axis deviation angle, which indicates an amount of deviation of the optical axis of the polarizing plate 2 from a set position by an angle.

Figure 4:
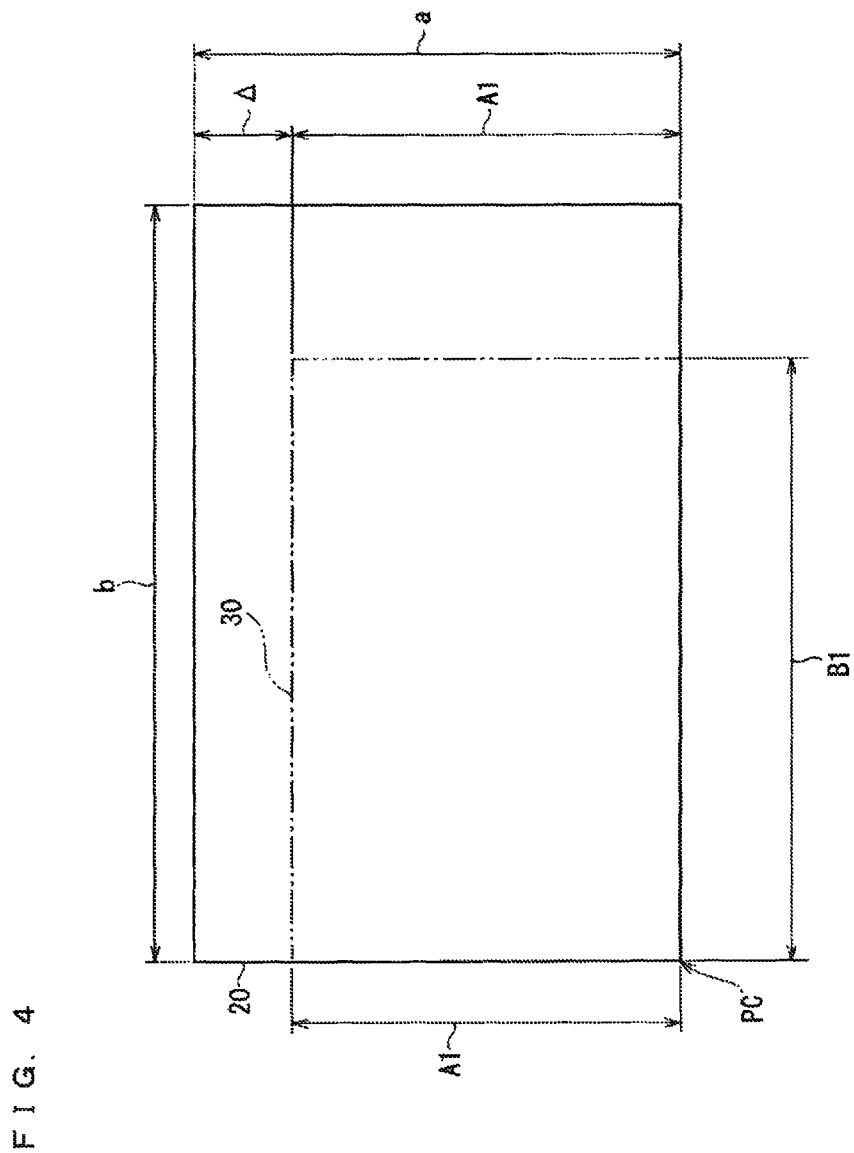
FIGS. 4 and 5 are diagrams for describing a second limiting condition such that the polarizing plate 2 can cover a region needed to be covered.
Figure 5:
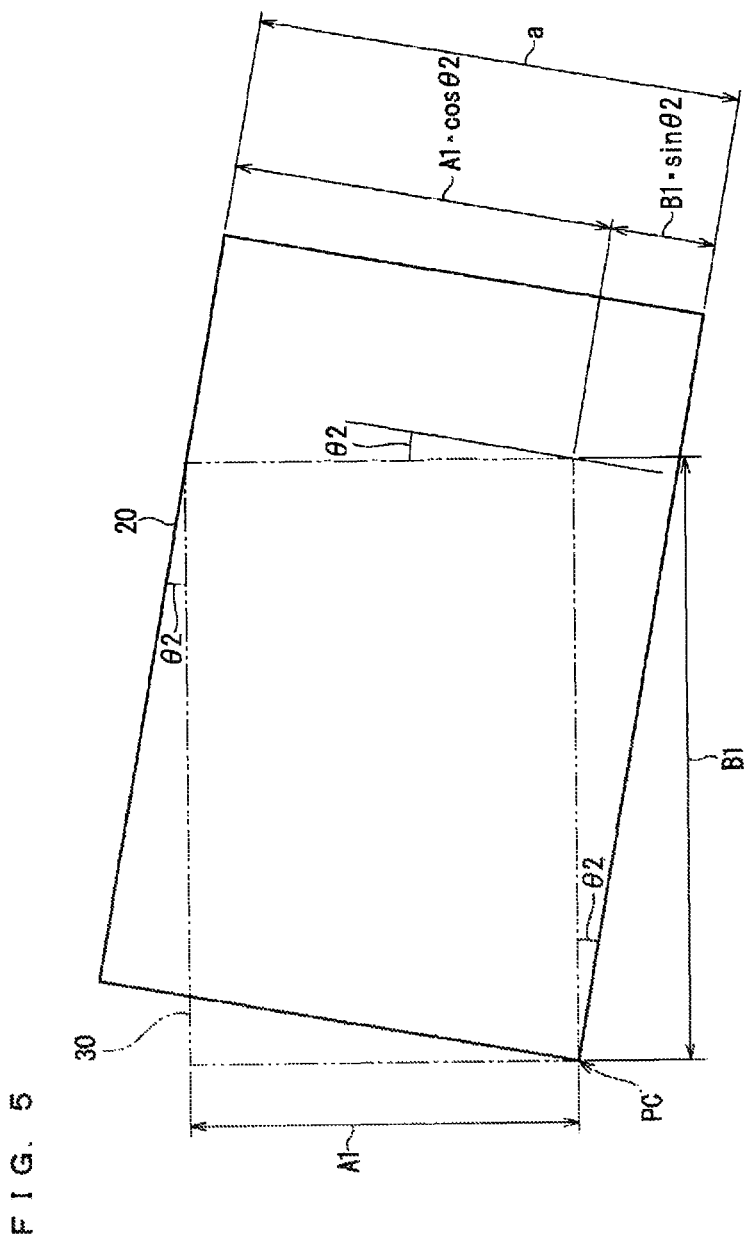

FIGS. 4 and 5 are diagrams for describing a second limiting condition such that the polarizing plate 2 can cover the region needed to be covered. FIGS. 4 and 5 show the outer shape of the polarizing plate 2 shown in FIG. 1, specifically, one-fourth the portion of the outer shape of the polarizing plate 2 with the reference numeral "20." FIGS. 4 and 5 show the outer shape of the display region 3, specifically, one-fourth the portion of the outer shape of the display region 3 with a reference numeral "30."

This preferred embodiment needs to obtain Δ that satisfies an expression (4) below.

$$\Delta = A1 \cdot \cos \theta 2 + B1 \cdot \sin \theta 2 - A1 \tag{4}$$

In the expression (4), a represents half (½) the length of the short side of the outer shape 20 of the polarizing plate 2, $\theta 2$ represents a maximum value (hereinafter referred to as a "rotatable angle" in some cases) of an angle allowing for a rotation of the polarizing plate 2, A1 represents half (½) a length of a short side of the outer shape 30 of the display region 3, B1 represents half (½) a length of the long side of the outer shape 30 of the display region 3, and Δ represents a distance (=a−A1) between an edge of the outer shape 20 of the polarizing plate 2 in a vertical direction to the paper plane of FIGS. 4 and 5 and the outer shape 30 of the display region 3. In the following descriptions, half (½) the length of the long side of the outer shape 20 of the polarizing plate 2 is shown with the reference numeral "b."

In FIGS. 2 to 5, in a case where the rotation angle $\theta 1$ of the polarizing plate 2 is greater than the rotatable angle $\theta 2$ ($\theta 1 > \theta 2$), the polarizing plate 2 cannot cover the region needed to be covered. Therefore, the condition such that the rotation angle $\theta 1$ of the polarizing plate 2 is less than or equal to the rotatable angle $\theta 2$ ($\theta 1 \leq \theta 2$) needs to be satisfied.

Products are preferably designed on the basis of the limiting condition by the expression (4) described above in the following manner. For example, for products that do not greatly need to reduce the size of a frame, first, the above-mentioned data that indicates the range of the manufacturing variations in the axis deviation angle of the polarizing plate 2 is considered, and the maximum axis deviation angle being assumed is set to the rotatable angle $\theta 2$ of the polarizing plate 2. Then, the distance between the edge of the outer shape 20 of the polarizing plate 2 and the outer shape 30 of the display region 3 is preferably designed relatively to the rotatable angle $\theta 2$ of the polarizing plate 2 so as to satisfy Δ determined by the expression (4). The distance between the edge of the outer shape 20 of the polarizing plate 2 and the outer shape 30 of the display region 3 is a width of a frame region 4 shown in FIG. 12, which is described later.

For products that greatly need to narrow a frame, the width of the frame region 4 may be a constraint. In this case, Δ set by a desired width of the frame region 4 and A1, B1 set by a size of the display region 3 are set in advance, and the rotatable angle $\theta 2$ satisfying the above-mentioned expression (4) is determined. Thus, the rotatable angle $\theta 2$ corresponding to the predetermined rotation angle $\theta 1$ can be determined. A specific chamfered shape can be selected from the determined rotatable angle $\theta 2$ by using the expression (2) and the expression (3) described above.

To calculate the rotatable angle $\theta 2$ satisfying the expression (4), the rotatable angle $\theta 2$ is directly expanded in an expression expressed by constants and is determined by an analytic solution, for example. This is not restrictive. A value of Δ is calculated by minute angle steps, for example, in increments of approximately 0.05°, correspondingly to a desired angle accuracy within a range of approximately 0° to 3° of the deviation angle that represents the rotatable angle $\theta 2$. Then, the calculated value of Δ is graphed. Thus, the rotatable angle $\theta 2$ in which the desired value of Δ may be obtained may be estimated by counting backwards the rotatable angle $\theta 2$.

As shown in FIG. 1, the four corner portions of the polarizing plate 2 are preferably chamfered so as to deal with both of a positive direction and a negative direction. The positive direction is a clockwise direction and the negative direction is a counterclockwise direction, the directions being seen from one side in a thickness direction of the polarizing plate 2.

This preferred embodiment described above shows the means of calculating the numerical values of the outer dimension of the liquid crystal panel 1, the outer dimension of the polarizing plate 2, the dimension of the display region 3, and the rotatable angle $\theta 2$ of the polarizing plate 2 at the time of being bonded by using the design value, specifically, the design center value, to determine the specific chamfered shape of the polarizing plate 2 and the axis deviation angle thereof.

As a matter of fact, not only the design center values of the outer dimension of the liquid crystal panel 1, the outer dimension of the polarizing plate 2, the dimension of the display region 3, and the rotatable angle $\theta 2$ of the polarizing plate 2 at the time of being bonded but also, for example, an outer tolerance of the polarizing plate 2, bonding accuracy of a bonding device, and accuracy of reducing a difference between an actual finished center value at the time of adjusting the device and a design center value, except for manufacturing variations in axis, influence whether the polarizing plate 2 protrudes and whether the polarizing plate 2 can cover the region needed to be covered.

Therefore, the amount of chamfering of the polarizing plate 2 is preferably determined while the information except for the manufacturing variations in axis is appropriately considered. This can maximize an adjustable range of the rotation angle $\theta 1$ of the polarizing plate 2 within the range having no influence on the display region 3.

In this preferred embodiment as described above, the polarizing plate 2 being the optical member has the chamfered portion subjected to the chamfering in which the chamfered shape is defined by x and y satisfying the relationships of the expressions (1), (2), and (3) described above. This suppresses the protrusion of the polarizing plate 2 from the outer shape of the liquid crystal panel 1, and the liquid crystal display having relatively small variations in quality can be obtained.

In this preferred embodiment, the liquid crystal panel 1 includes the display region 3 that has the rectangular shape and is used for display and the frame region 4 that surrounds the display region 3 and is defined by Δ satisfying the relationship of the above-mentioned expression (4). Defining the frame region 4 by Δ satisfying the relationship of the above-mentioned expression (4) can form the chamfered portion having a more proper chamfered shape. Therefore, the protrusion of the polarizing plate 2 from the outer shape of the liquid crystal panel 1 can be more reliably suppressed.

In this preferred embodiment, the rotation angle $\theta 1$ of the polarizing plate 2 is greater than 0 and less than or equal to the rotatable angle $\theta 2$ ($0 < \theta 1 \leq \theta 2$). Setting the rotation angle $\theta 1$ of the polarizing plate 2 in such manner allows the polarizing plate 2 to more reliably cover the region needed to be covered. Therefore, a high quality liquid crystal display can be more reliably obtained.

Particularly when the rotation angle $\theta 1$ of the polarizing plate 2 is set to a value equal to the rotatable angle $\theta 2$, the rotation angle $\theta 1$ of the polarizing plate 2 can fall within the maximum range. Therefore, the protrusion of the polarizing plate 2 from the outer shape of the liquid crystal panel 1 can be more reliably suppressed.

In this preferred embodiment, the chamfered portions are formed in the four corner portions of the polarizing plate 2. Consequently, the protrusion of the polarizing plate 2 from the outer shape of the liquid crystal panel 1 can be more reliably suppressed.

Second Preferred Embodiment

FIG. 6 shows an example of a state in which a polarizing plate 21 is bonded to a liquid crystal panel 1 in a polarizing plate bonding step in a method for manufacturing a liquid crystal display in a second preferred embodiment of the present invention. In the first preferred embodiment described above, the four corner portions of the polarizing plate 2 are chamfered while two corner portions of the polarizing plate 21 are chamfered in this preferred embodiment.

For example, in a case where there is space for a bonding position in a vertical direction with respect to a display surface of the liquid crystal panel, namely, the vertical direction to the paper plane of FIG. 6, the two corner portions of the polarizing plate 21 may be chamfered similarly to this preferred embodiment. In this preferred embodiment, each of the two corner portions has one chamfered portion.

In this case, the chamfered corner portions of the polarizing plate 21 are bonded close to an outer peripheral portion of the liquid crystal panel 1, and thus the same effects as those in the case where the four corner portions of the polarizing plate 2 are chamfered similarly to the first preferred embodiment described above can be obtained.

Third Preferred Embodiment

FIG. 7 shows an example of a state in which a polarizing plate 22 is bonded to a liquid crystal panel 1 in a polarizing plate bonding step in a method for manufacturing a liquid crystal display in a third preferred embodiment of the present invention. In this preferred embodiment, two corner portions of the polarizing plate 22 diagonally opposed to each other are chamfered.

For example, in a case where a direction in which an angle deviation of an optical axis of the polarizing plate 22 occurs has such a tendency as to deviate only in one of positive and negative directions from a predetermined angle due to a manufacturing process of the polarizing plate 22 being used, which needs a correction only in one of rotation directions, the two corner portions diagonally opposed to each other may be chamfered similarly to this preferred embodiment. Consequently, the same effects as those in the case where the four corner portions of the polarizing plate 2 are chamfered similarly to the first preferred embodiment described above can be obtained.

Fourth Preferred Embodiment

Figure 8:
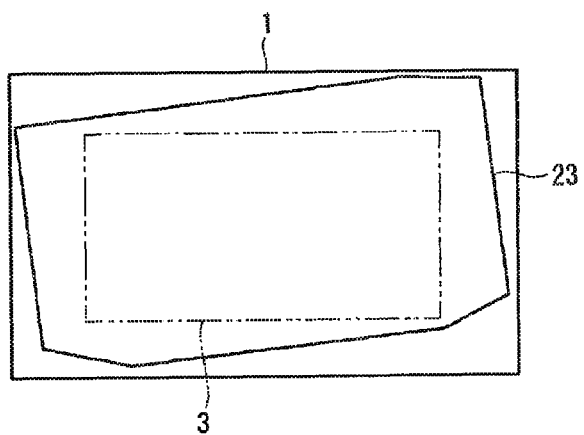
FIG. 8 shows an example of a state in which a polarizing plate 23 is bonded to a liquid crystal panel 1 in a polarizing plate bonding step in a method for manufacturing a liquid crystal display in a fourth preferred embodiment of the present invention.

FIG. 8 shows an example of a state in which a polarizing plate 23 is bonded to a liquid crystal panel 1 in a polarizing plate bonding step in a method for manufacturing a liquid crystal display in a fourth preferred embodiment of the present invention.

For this preferred embodiment, the second preferred embodiment and the third preferred embodiment described above are combined, and three corner portions are chamfered so as to have chamfered portions. In this preferred embodiment, each of the three corner portions has one chamfered portion. Also in this case, the same effects as those in the case where the four corner portions of the polarizing plate 2 are chamfered similarly to the first preferred embodiment described above can be obtained.

Fifth Preferred Embodiment

Figure 9:
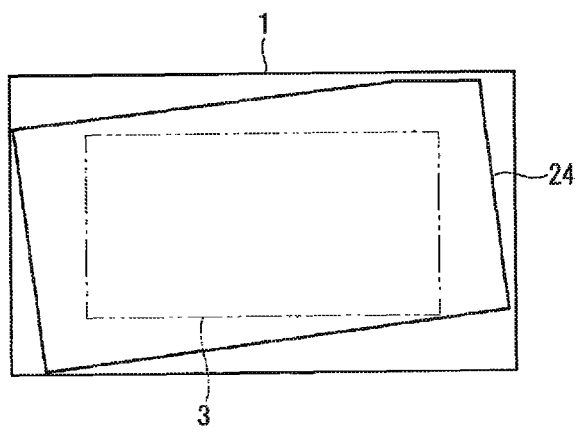
FIG. 9 shows an example of a state in which a polarizing plate 24 is bonded to a liquid crystal panel 1 in a polarizing plate bonding step in a method for manufacturing a liquid crystal display in a fifth preferred embodiment of the present invention.

FIG. 9 shows an example of a state in which a polarizing plate 24 is bonded to a liquid crystal panel 1 in a polarizing plate bonding step in a method for manufacturing a liquid crystal display in a fifth preferred embodiment of the present invention.

For this preferred embodiment, the second preferred embodiment and the third preferred embodiment described above are combined, and only one corner portion is chamfered. Also in this case, the same effects as those in the case where the four corner portions of the polarizing plate 2 are chamfered similarly to the first preferred embodiment described above can be obtained.

Sixth Preferred Embodiment

FIG. 10 shows an example of a state in which a polarizing plate 25 is bonded to a liquid crystal panel 1 in a polarizing plate bonding step in a method for manufacturing a liquid crystal display in a sixth preferred embodiment of the present invention.

For this preferred embodiment, each corner portion of the polarizing plate 25 is chamfered for a plurality of times. For example, in a case where the long side and the short side of the polarizing plate 25 each have constraints, the four corner portions of the polarizing plate 25 may be chamfered such that each of the fours corner portions has two chamfered portions. Specifically, as shown in FIG. 10, the four corner portions of the polarizing plate 25 may be chamfered such that the polarizing plate 25 has a dodecagonal shape. Also in this case, the same effects as those in the case where the four corner portions of the polarizing plate 2 are chamfered similarly to the first preferred embodiment described above can be obtained.

In each of the preferred embodiments above, as shown in FIGS. 1 to 10, chamfering of the polarizing plates 2, 21, 22, 23, 24, 25 is so-called C chamfering in which the chamfered shape is linear. Using the C chamfering allows chamfering with a cutting die having a linear cut pattern or a cutting machine that enables linear cutting, so that chamfering can be easily performed.

Seventh Preferred Embodiment

FIG. 11 shows an example of a state in which a polarizing plate 26 is bonded to a liquid crystal panel 1 in a polarizing plate bonding step in a method for manufacturing a liquid crystal display in a seventh preferred embodiment of the present invention. The first to sixth preferred embodiments described above use the C chamfering while this preferred embodiment uses so-called R chamfering in which a chamfered shape is curved.

Chamfering of the polarizing plate 26 under processing constraints may be the R chamfering in which the chamfered shape is curved similarly to this preferred embodiment.

For the curved chamfered shape similarly to this preferred embodiment, the polarizing plate 26 may fail to cover a region needed to be covered, such as a display region 3, in a region from which the linear chamfered portion by the C chamfering is subtracted, thus requiring caution. As for the basic effects of the present invention, the same effects as those in the first to sixth preferred embodiments using the linear C chamfering can be obtained.

In the first to seventh preferred embodiments as described above, the polarizing plates 2, 21, 22, 23, 24, 25, 26 are chamfered in consideration of the outer dimension of the liquid crystal panel 1, the dimensions of the polarizing plates 2, 21, 22, 23, 24, 25, 26, the dimension of the display region, and the rotation angle at the time of bonding.

This prevents the protrusions of the polarizing plates 2, 21, 22, 23, 24, 25, 26 from the outer shape of the liquid crystal panel 1. Moreover, the polarizing plates 2, 21, 22, 23, 24, 25, 26 cover the display region 3 being the region needed to be covered, axis deviations of absorption axes of the polarizing plates 2, 21, 22, 23, 24, 25, 26 from the outer shapes thereof can be corrected.

Eighth Preferred Embodiment

Figure 12:
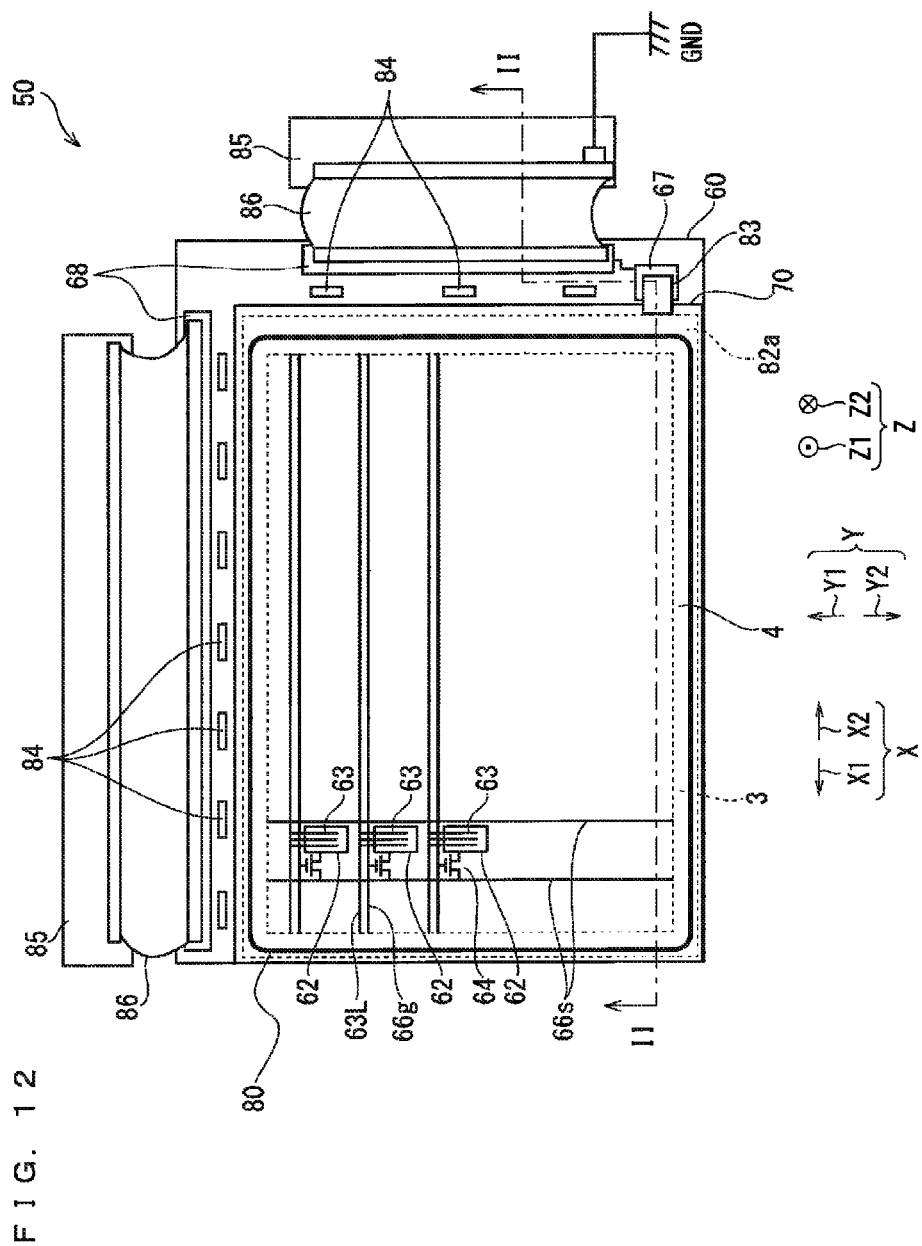
FIG. 12 is a plan view showing a configuration of a liquid crystal panel 50 included in a liquid crystal display in an eighth preferred embodiment of the present invention.
Figure 13:
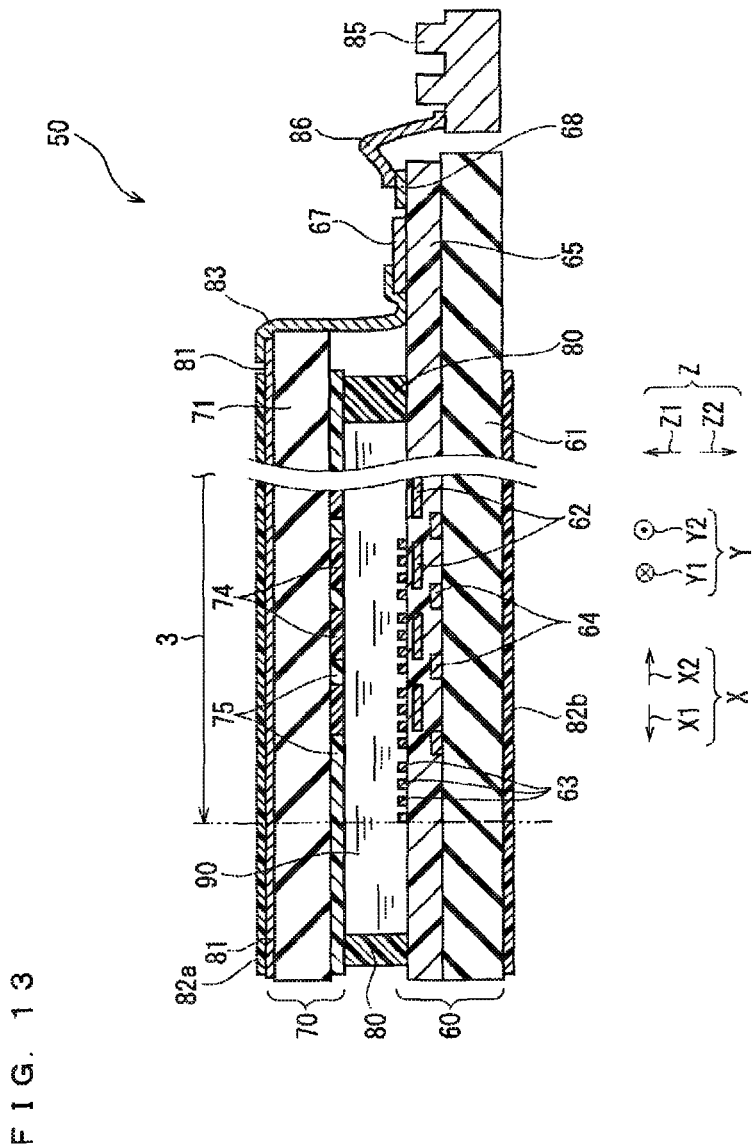
FIG. 13 is a cross-sectional view of the liquid crystal panel 50 when seen from a II-II cut surface line in FIG. 12.

This preferred embodiment more specifically describes the present invention applied to a liquid crystal display and a method for manufacturing the liquid crystal display. FIG. 12 is a plan view showing a configuration of a liquid crystal panel 50 included in a liquid crystal display in an eighth preferred embodiment of the present invention. FIG. 13 is a cross-sectional view of the liquid crystal panel 50 when seen from a II-II cut surface line in FIG. 12.

This preferred embodiment describes an example of manufacturing the liquid crystal display by using a polarizing plate 82*a* and a polarizing plate 82*b* chamfered similarly to the polarizing plate 2 in the first preferred embodiment. FIGS. 12 and 13 show, as an example, a lateral electric field liquid crystal panel 50 operated by using TFTs being switching elements. The liquid crystal panel 50 in this preferred embodiment is more specifically a liquid crystal panel employing a fringe field switching (FFS) mode, and the present invention applied to the liquid crystal panel 50 is described.

As shown in FIGS. 12 and 13, the liquid crystal panel 50 includes a TFT substrate 60, a color filter substrate 70, and a sealing material 80.

Both outer shapes of the TFT substrate 60 and the color filter substrate 70 are a rectangle, more specifically, an oblong. In this preferred embodiment, the outer dimension of the TFT substrate 60 is greater than the outer dimension of the color filter substrate 70. The TFT substrate 60 has a protruding portion that is part of an outer peripheral end face of the color filter substrate 70 protruding, and the TFT substrate 60 is disposed so as to be laminated on the color filter substrate 70.

In the following descriptions, a long-side direction of the TFT substrate 60 and the color filter substrate 70 is an X direction, a short-side direction thereof is a Y direction, and a direction orthogonal to the X direction and the Y direction is a Z direction. The X direction and the Y direction are orthogonal to each other. In FIG. 12, the X direction is the horizontal direction to the paper plane, the Y direction is the vertical direction to the paper plane, and the Z direction is the perpendicular direction to the paper plane.

The X direction includes two directions, one of them being an X1 direction, another direction being an X2 direction. The Y direction includes two directions, one of them being a Y1 direction, another direction being a Y2 direction. The Z direction includes two directions, one of them being a Z1 direction, another direction being a Z2 direction. In FIG. 12, a direction from the right side to the left side with respect to the paper plane of FIG. 12 is the X1 direction while a direction from the left side to the right side with respect to the paper plane of FIG. 12 is the X2 direction. An upward direction with respect to the paper plane of FIG. 12 is the Y1 direction while a downward direction with respect to the paper plane of FIG. 12 is the Y2 direction. A direction from the posterior side to the anterior side in the paper plane of FIG. 12 is the Z1 direction while a direction from the anterior side to the posterior side in the paper plane of FIG. 12 is the Z2 direction.

The TFT substrate 60 includes TFTs 64 being switching elements arranged in an array. The color filter substrate 70 being a counter substrate is aligned so as to oppose to the TFT substrate 60. The color filter substrate 70 includes a display region 3 on which an image is displayed. The sealing material 80 is disposed so as to surround a region corresponding to the display region 3 and seals the gap between the color filter substrate 70 and the TFT substrate 60.

A plurality of columnar spacers, which are not shown, are disposed in the display region 3 between the TFT substrate 60 and the color filter substrate 70. The columnar spacers create and maintain the gap having a predetermined distance between the TFT substrate 60 and the color filter substrate 70.

A liquid crystal layer 90 is sandwiched in the region corresponding to at least the display region 3 in the gap between the color filter substrate 70 and the TFT substrate 60, the gap being sealed with the sealing material 80 and being maintained by the columnar spacers. The sealing material 80 is disposed in the frame region 4 disposed outside the region corresponding to the display region 3.

Herein, the "display region 3" is referred to as a region on the TFT substrate 60 of the liquid crystal panel 50, a region on the color filter substrate 70, or a region sandwiched between both of the TFT substrate 60 and the color filter substrate 70, the regions being used for display.

The "frame region 4" is referred to as a region having a frame shape that is located outside the display region 3 and surrounds the display region 3 in the region on the TFT substrate 60 of the liquid crystal panel 50, the region on the color filter substrate 70, or the region sandwiched between the TFT substrate 60 and the color filter substrate 70. In this preferred embodiment, the frame region 4 is a remaining region of the whole region on the TFT substrate 60 of the liquid crystal panel 50, the whole region on the color filter substrate 70, or the whole region sandwiched between the TFT substrate 60 and the color filter substrate 70, with the exception of the display region 3.

The color filter substrate 70 described above includes a glass substrate 71 being a first transparent substrate, an alignment film, which is not shown, for aligning liquid crystals, a color filter 74 formed of color material layers, and a light-shielding layer 75.

The alignment film is disposed in the region corresponding to the display region 3 on a surface of the glass substrate 71 oil one side in a thickness direction. The color filter 74 is disposed below the alignment film. The light-shielding layer 75 is disposed so as to shield the portion between the color filters 74 from light or shield the frame region 4 located outside the region corresponding to the display region 3 from light.

The color filter 74 is formed of, for example, the color material layers in which pigments are dispersed in resin. The color filter 74 functions as a filter that selectively transmits light, such as red, green, and blue, in a range of a specific wavelength, and the color filter 74 is formed of the color material layers in the different colors aligned regularly.

The light-shielding layer 75 is formed of, for example, metallic materials containing, chrome oxide or resin materials in which black particles are dispersed in resin. The other preferred embodiments of the present invention may have a configuration in which an overcoat layer formed of a transparent resin film is disposed below the alignment film so as to cover the color filter 74 and the light-shielding layer 75.

The color filter substrate 70 includes an antistatic transparent conductive layer 81 on a surface on another side in the thickness direction of the glass substrate 71. The antistatic transparent conductive layer 81 is connected to a ground. The antistatic transparent conductive layer 81 is disposed so as to cover at least the display region 3 of the glass substrate 71. The antistatic transparent conductive layer 81, which is effective in preventing electrostatic buildup and display defects caused by an external electric field, is disposed in the lateral electric field liquid crystal panel 50 in this preferred embodiment.

The TFT substrate 60 described above includes a glass substrate 61 being a second transparent substrate, an alignment film for aligning the liquid crystals, pixel electrodes 62, counter electrodes 63, the TFTs 64, an insulating film 65, a plurality of gate wires 66g, a plurality of source wires 66s, source electrodes, and drain electrodes, the alignment film, the source electrodes, and the drain electrodes not being shown.

The alignment film is disposed in a region corresponding to the display region 3 on a surface of the glass substrate 61 on a side opposed to the color filter substrate 70. The pixel electrodes 62 and the counter electrodes 63 are disposed below the alignment film. The pixel electrodes 62 and the counter electrodes 63 are electrodes in pairs that generate electric fields in a direction parallel to the substrate surface of the TFT substrate 60 or the color filter substrate 70 and apply voltage for driving the liquid crystals.

The TFTs 64 are switching elements for writing voltage to the pixel electrodes 62 being ones of the pairs of the electrodes. The TFTs 64 are covered with the insulating film 65.

The gate wires 66g and the source wires 66s supply signals to the TFTs 64. The gate wires 66g are connected to gate electrodes forming the TFTs 64. The source wires 66s are connected to the source electrodes and the drain electrodes forming the TFTs 64.

In this preferred embodiment, the pixel electrodes 62 and the counter electrodes 63 being the electrodes in pairs that apply voltage for driving the liquid crystals are formed in the following manner. The pixel electrode 62 being one of the electrodes has a plate-shaped transparent conductive film pattern. The counter electrode 63 being the other electrode has, for example, a transparent conductive film pattern having a plurality of slit openings arranged in parallel. The counter electrode 63 may have a comb-shaped transparent conductive film pattern. The counter electrodes 63 are disposed over the pixel electrodes 62 with the insulating layer therebetween.

In the following descriptions, electrodes, such as the counter electrodes 63, having the comb-shaped transparent conductive film pattern or the transparent conductive film pattern having the plurality of slit openings arranged in parallel may be referred to as "slit electrodes" in some cases. Portions of the electrode having the comb-shaped transparent conductive film pattern and slit openings of the transparent conductive film pattern having the plurality of slit openings arranged in parallel may be referred to as "slit portions" in some cases.

The configurations of the pixel electrodes 62 and the counter electrodes 63 are not limited to the configurations above. For example, shapes and positions in the vertical direction of the pixel electrodes 62 and the counter electrodes 63 may be reversed from those in this preferred embodiment.

In this case, the pixel electrodes 62 are formed as the slit electrodes. Specifically, the pixel electrodes 62 have the comb-shaped transparent conductive film pattern or the transparent conductive pattern having the plurality of slit openings arranged in parallel, and the pixel electrodes 62 are disposed over the counter electrodes 63. The counter electrodes 63 have the plate-shaped transparent conductive film pattern and are disposed below the pixel electrodes 62.

The TFTs 64 may be connected to the pixel electrodes 62 having the comb-shaped transparent conductive film pattern or the transparent conductive pattern having the plurality of slit openings arranged in parallel and may apply voltage to the pixel electrodes 62.

Specific planar pattern shapes of the pixel electrodes 62 and the counter electrodes 63 are not shown and not described, but planar pattern shapes of pixel electrodes and counter electrodes in a liquid crystal panel employing the publicly-known FFS mode may be used.

The insulating film in this preferred embodiment, for example, the insulating film 65 forming the TFT substrate 60 and the insulating film between the pixel electrodes 62 and the counter electrodes 63, may be formed by a single-layer transparent insulating film or a multilayer laminated film having a lamination of transparent insulating films.

As FIG. 12 schematically shows the positions, the plurality of gate wires 66g formed in the display region 3 are aligned in parallel. Similarly, the plurality of source wires 66s are aligned in parallel. The gate wires 66g and the source wires 66s are disposed so as to cross each other.

The gate electrodes, the source electrodes, and the drain electrodes forming the TFTs 64 are arranged in an array correspondingly to regions (hereinafter referred to as "pixel regions" in some cases) surrounded by the plurality of gate wires 66g and the plurality of source wires 66s crossing each other.

Common wires 63L as many as the gate wires 66g are disposed in parallel to the gate wires 66g, the common wires 63L supplying common potentials to the counter electrodes 63. The common wires 63L are connected to the counter electrodes 63 each in the pixel region and make all potentials of the counter electrodes 63 each in the pixel region to be the common potentials.

A signal terminal 68 is included in the frame region 4 on the TFT substrate 60, more specifically, on the surface of the protruding portion of the TFT substrate 60 on the side facing the color filter substrate 70, the protruding portion protruding farther than the end face of the color filter substrate 70, the signal terminal 68 receiving, from the outside, signals to be supplied to the TFTs 64.

FIGS. 12 and 13 show the signal terminal 68 having the integrated configuration. In reality, a plurality of signal terminals 68 are aligned in a lateral direction of oblong pads, the lateral direction being the Y direction in the diagram. The oblong pads that extend in a longitudinal direction being the perpendicular direction to an end side of the substrate close to the signal terminals 68 are formed at intervals correspondingly to a plurality of signals.

Furthermore, the pads for the signal terminals 68 are each connected to a control substrate 85 through a flexible flat cable (FFC) 86 being connection wiring. The control substrate 85 includes control integrated circuit (IC) chips that produce control signals for controlling drive IC chips 84.

The control signals from the control substrate 85 are input, through the signal terminals 68, to an input side of the drive IC chips 84 installed on the protruding portion. Output signals output from an output side of the drive IC chips 84 are supplied to the TFTs 64 in the display region 3 through a plurality of signal lead wires, which are not shown, being led from the display region 3.

The color filter substrate 70 being the counter substrate includes a counter-substrate-side polarizing plate 82a on the antistatic transparent conductive layer 81 located on the outer surface of the color filter substrate 70 with respect to the liquid crystal layer 90.

The TFT substrate 60 includes a TFT-substrate-side polarizing plate 82b on the surface of the glass substrate 61 opposite to the surface facing the liquid crystal layer 90, namely, on the outer surface of the glass substrate 61.

The counter-substrate-side polarizing plate 82a and the TFT-substrate-side polarizing plate 82b are chamfered such that the corner portions of the polarizing plates 82a, 82b have the predetermined shapes as specifically described in the first preferred embodiment. In this preferred embodiment, the four corner portions of each of the polarizing plates 82a, 82b are chamfered similarly to the first preferred embodiment. This prevents the protrusion of the end portion of the counter-substrate-side polarizing plate 82a from the edge of the outer shape of the liquid crystal panel 50.

The counter-substrate-side polarizing plate 82a is disposed so as to cover at least the display region 3 of the color filter substrate 70 while the TFT-substrate-side polarizing plate 82b is disposed so as to cover at least the display region 3 of the TFT substrate 60.

The antistatic transparent conductive layer 81 formed on the surface of the color filter substrate 70 is connected to the ground. In this preferred embodiment, for example, an earth pad 67 is located on the protruding portion of the TFT substrate 60, and the antistatic transparent conductive layer 81 is connected to the earth pad 67 with a conductive tape 83. Thus, the antistatic transparent conductive layer 81 is grounded.

Most of the antistatic transparent conductive layer 81 is covered with the counter-substrate-side polarizing plate 82a, and an uncovered portion that is not partially covered with the counter-substrate-side polarizing plate 82a is formed at the end portion of the color filter substrate 70. The conductive tape 83 is bonded to the uncovered portion of the antistatic transparent conductive layer 81 and connected to the antistatic transparent conductive layer 81.

The earth pad 67 is connected to the ground through the signal terminal 68 and the FFC 86, so that the antistatic transparent conductive layer 81 is connected to the ground through these paths.

A conductive adhesive is applied to a base material of metal foil such as aluminum (Al) foil and copper (Cu) foil, which can be used as the conductive tape 83, and a conductive tape on the market can be used.

The liquid crystal display in this preferred embodiment includes the liquid crystal panel 50 with the configuration described above, a backlight unit being a lighting device, an optical sheet, and a housing, the backlight unit, the optical sheet, and the housing not being shown.

The backlight unit is disposed, with respect to the liquid crystal panel 50, on the side opposite to the display surface formed in the display region 3 of the color filter substrate 70 with the optical sheet therebetween. The backlight unit faces the substrate surface of the TFT substrate 60 and is a light source thereof. The optical sheet has the function of adjusting light (hereinafter referred to as "backlight" in some cases) from the backlight unit.

The housing has a shape in which a portion corresponding to the display region 3 is open. The liquid crystal display includes the liquid crystal panel 50 housed in the housing with the optical members such as the backlight unit and the optical sheet mentioned above.

The liquid crystal display in this preferred embodiment as described above operates in the following manner. For example, the control signals are input from the control substrate 85 to operate the drive IC chips 84, and the control signals are transmitted to the pixel regions through the wiring in the display region 3. As a result, electric fields parallel to the substrate surface of the TFT substrate 60 or the color filter substrate 70, more specifically, a mix of electric fields in parallel and electric fields almost in parallel in the FFS mode occurs between the pixel electrode 62 and the common electrode 63 located in each of the pixel regions. Thus, a predetermined drive voltage that generates electric fields mainly containing components of the electric fields in parallel is applied.

The directions of molecules of the liquid crystals change according to the drive voltage. Then, the light emitted from the backlight unit is transmitted to the observer side or shielded through the TFT substrate 60, the liquid crystal layer 90, and the color filter substrate 70, to thereby display an image on the display surface formed in the display region 3 on the color filter substrate 70 side of the liquid crystal panel 50.

Figure 14:
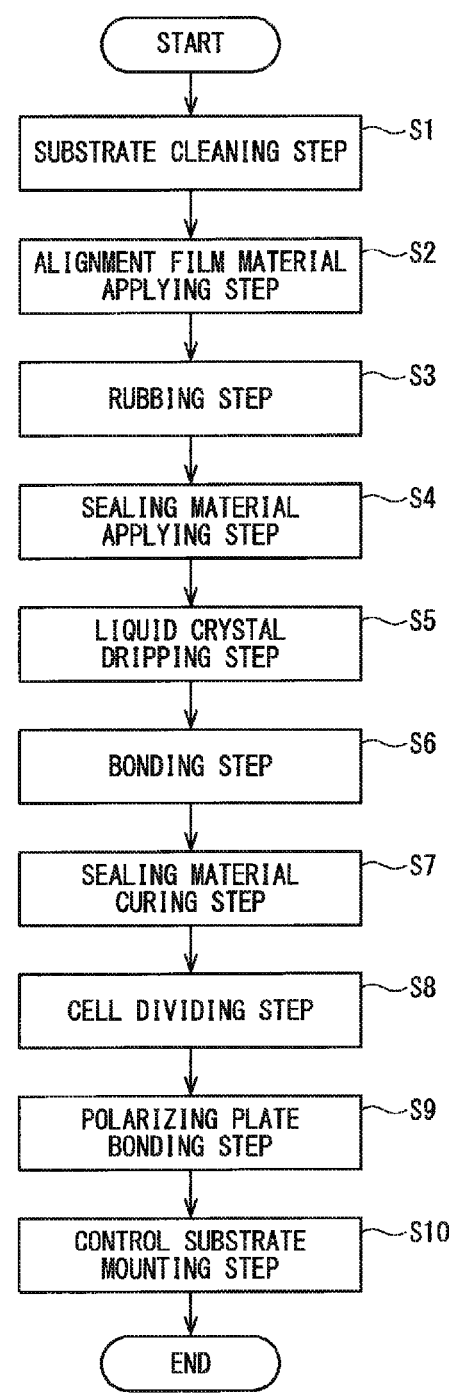
FIG. 14 is a flow chart showing steps of manufacturing the liquid crystal panel 50.

Next, a method for manufacturing a liquid crystal display in this preferred embodiment is described. FIG. 14 is a flow chart showing steps of manufacturing the liquid crystal panel 50. Herein, the characteristic steps of manufacturing the liquid crystal panel in this preferred embodiment are described one by one according to the flow chart shown in FIG. 14, and the particularly important steps are described with reference to FIGS. 15 to 17 as appropriate.

First, a substrate preparing step prepares a mother TFT substrate being a motherboard from which TFT substrates 60 are taken out and a mother color filter substrate being a motherboard from which color filter substrates 70 are taken out before bonding to each other.

The predetermined number of the TFT substrates 60 and the color filter substrates 70 having the same configurations are aligned on each of the motherboards.

The mother TFT substrate including the configuration of the TFT substrate 60 and the mother color filter substrate including the configuration of the color filter substrate 70 can be manufactured by appropriately combining the method for manufacturing a TFT substrate and a color filter substrate in a liquid crystal display of the publicly-known FFS mode, the publicly-known film forming step, and a plurality of patterning steps if the configuration of the TFT substrate 60 is known in detail as described with reference to FIGS. 12 and 13. Therefore, more specific descriptions of the method for manufacturing a mother TFT substrate and a mother color filter substrate themselves are omitted.

Then, Step S1 in FIG. 14 performs a substrate cleaning step of cleaning the mother TFT substrate that is prepared in the substrate preparing step mentioned above and includes the TFT substrate 60.

Next, Step S2 performs an alignment film material applying step. In the alignment film material applying step, an alignment film material is applied to a surface of the mother TFT substrate on one side in a thickness direction. For example, the alignment film material applying step applies the alignment film material made of an organic film by printing and dries it by a firing process with a hot plate.

Subsequently, Step S3 performs a rubbing step. The rubbing step rubs the alignment film material and performs an alignment process on the surface of the alignment film material, to thereby form an alignment film on the TFT substrate 60 side.

By the same steps as Step S1 to Step S3, the mother color filter substrate including the color filter substrate 70 is also subjected to cleaning, the application of the alignment film material, and rubbing. Consequently, the alignment film on the color filter substrate 70 side is formed.

Next, Step S4 performs a sealing material applying step. The sealing material applying step applies the sealing material 80 serving as printing paste to the surfaces of the mother TFT substrate and the mother color filter substrate on the one side in the thickness direction by a screen printing device, to thereby form the sealing material 80 into a pattern having a shape that surrounds the display region 3.

Next, Step S5 performs a liquid crystal dripping step. The liquid crystal dripping step puts many drops of the liquid crystals into the region surrounded by the sealing material 80 on the surfaces on the one side in the thickness direction of the mother TFT substrate and the mother color filter substrate. Specifically, many drops of the liquid crystals are put into the region surrounded by the sealing material 80 on the color filter substrate 70 of the mother color filter substrate so as to form the liquid crystal layer 90 in the predetermined amount in total.

Herein, the technique fir filling the liquid crystal layer 90 with the liquid crystals by so-called drop injection to form the liquid crystal layer 90 is shown as an example, so that the liquid crystal layer 90 is formed in the manner described above. For so-called vacuum injection, the sealing material 80 has an incompletely closed shape and has a liquid crystal inlet being a partial opening formed therein.

After the TFT substrate 60 and the color filter substrate 70 are bonded to each other, the liquid crystals are injected from the liquid crystal inlet, so that the process of forming the drops of the liquid crystals is omitted.

Next, Step S6 performs a bonding step. The bonding step bonds the mother TFT substrate and the mother color filter substrate to form a cell substrate. Specifically, the mother TFT substrate and the mother color filter substrate are brought close to each other with the drops of the liquid crystals thereon, and the mother TFT substrate and the mother color filter substrate are aligned and laminated.

As a result, the drops of the liquid crystals evenly spread out between the mother TFT substrate and the mother color filter substrate, to thereby become the integrated liquid crystal layer 90 that fills in each capacity surrounded by the sealing material 80 between the mother TFT substrate and the mother color filter substrate.

Next, Step S7 performs a sealing material curing step. The sealing material curing step completely cures the sealing material 80 while the mother TFT substrate and the mother color filter substrate are bonded to each other.

The sealing material curing step applies heat or X rays to the sealing material 80 depending on the material, for example. In this preferred embodiment, curing is performed by the technique for applying X rays, which is compatible with the drop injection.

The sealing material curing step fixes the mother TFT substrate and the mother color filter substrate kept in the positions in which they have been aligned. To reduce the thickness of the substrate for weight reduction of the liquid crystal panel, a thinning process with a chemical solution and by mechanical polishing is preferably performed while the mother TFT substrate and the mother color filter substrate are bonded to each other.

Next, Step S8 performs a cell dividing step. The cell dividing step divides the cell substrate into a plurality of individual cells. When the region surrounded by the sealing material 80 is filled with the liquid crystals by the so-called vacuum injection, the liquid crystal inlet being the partial opening is formed in the sealing material 80 as described above, and the liquid crystals are then injected into each of the individual cells from the liquid crystal inlet in a liquid crystal injecting step performed after the cell dividing step of Step S8. The liquid crystal injecting step injects the liquid crystals from the liquid crystal inlet by the vacuum injection, for example, to thereby form the liquid crystal layer 90. Furthermore, the liquid crystal inlet is sealed in a sealing step. For example, the sealing step seals the liquid crystal inlet with photocurable resin and applies light thereto.

After the cell substrate is divided into the shapes of the individual liquid crystal panels as described above, Step S9 performs a polarizing plate bonding step. The polarizing plate bonding step respectively bonds the counter-substrate-side polarizing plate 82a and the TFT-substrate-side polarizing plate 82b as optical films to the surface of the color filter substrate 70 and the surface of the TFT substrate 60 of the individual cells. The polarizing plate bonding step is important in the steps of manufacturing a liquid crystal panel, which will be separately described in detail after each of the steps of manufacturing a liquid crystal panel is described.

Then, Step S10 performs a control substrate mounting step. The control substrate mounting step mounts the drive IC chips 84 and the control substrate 85. The control substrate mounting step bonds the FFC 86 to the signal terminals 68 so as to conduct electricity, the FFC 86 being bonded to the drive IC chips 84 and the control substrate 85. The conductive tape 83 is bonded to the color filter substrate 70 and the TFT substrate 60 and connects therebetween, which allows current to pass through the antistatic transparent conductive layer 81 on the surface of the color filter substrate 70 and the earth pad 67 on the surface of the TFT substrate 60. The liquid crystal panel 50 is completed by the steps above.

Lastly, the backlight unit is disposed with respect to the liquid crystal panel 50 with the optical sheet therebetween such that the backlight unit faces the liquid crystal panel 50, and the liquid crystal panel 50 and the backlight unit are housed in the housing in which the outer portion being the display surface of the color filter substrate 70 in the display region 3 is open. This completes the liquid crystal display in this preferred embodiment.

Figure 15:
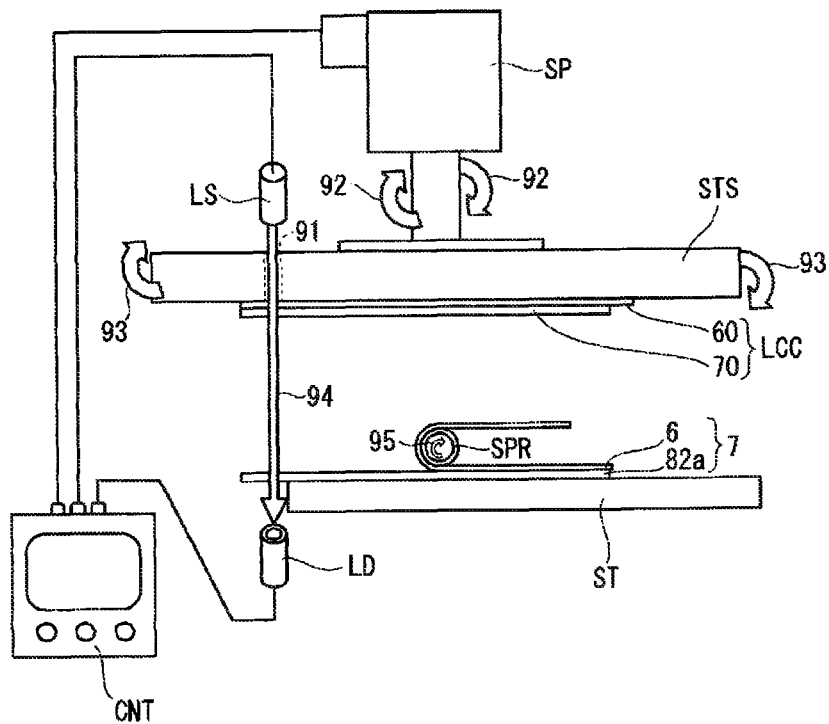
FIGS. 15 and 16 are diagrams showing configurations of a polarizing plate bonding device.
Figure 16:
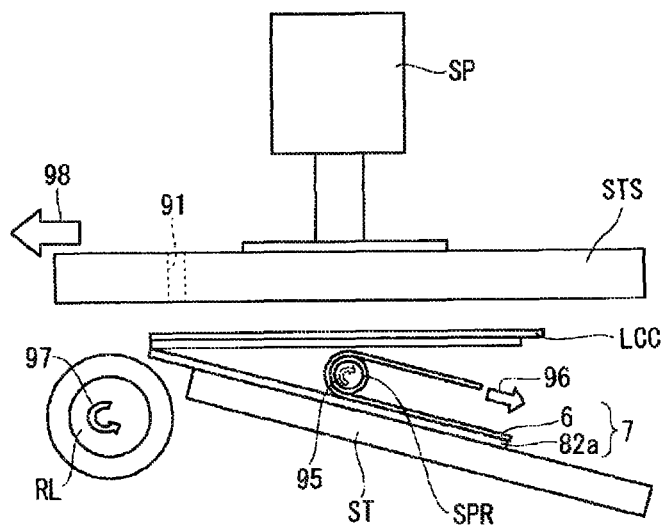

Next, the polarizing plate bonding step of Step S9, which is the important step in the steps of manufacturing the liquid crystal panel 50, is described in detail with reference to FIGS. 15 and 16. FIGS. 15 and 16 are diagrams showing configurations of a polarizing plate bonding device.

As for the counter-substrate-side polarizing plate 82a and the TFT-substrate-side polarizing plate 82b, a polarizing plate sheet member being the original member of the counter-substrate-side polarizing plate 82a is prepared, and the polarizing plate bonding step is performed. The polarizing plate sheet member has the outer shape chamfered such that the corner portions have the predetermined shapes described in the first preferred embodiment, and the polarizing plate sheet member is an octagon if made similarly to the first preferred embodiment. At the stage of the polarizing plate sheet member, the polarizing plate sheet member is formed of the counter-substrate-side polarizing plate 82a on which a separator 6 is additionally laminated.

In the following descriptions, before the stage of the liquid crystal panel 50 in FIGS. 12 and 13 described above, a "liquid crystal cell LCC" is referred to as the TFT substrate 60 and the color filter substrate 70 bonded to each other, more specifically, before the control substrate 85 and the FFC 86 are mounted thereon.

The liquid crystal cell LCC includes the counter-substrate-side polarizing plate 82a bonded to the surface of the color filter substrate 70 and the TFT-substrate-side polarizing plate 82b bonded to the surface of the TFT substrate 60. Both of the polarizing plate bonding steps are not greatly different from each other, so that bonding of the countersubstrate-side polarizing plate 82*a* to the surface of the color filter substrate 70 being the liquid crystal cell LCC is described here as an example.

The polarizing plate bonding device used in the polarizing plate bonding step of Step S9 in the method for manufacturing a liquid crystal display in this preferred embodiment includes a rotation stage STS, a stage ST, a rotation mechanism SP, a separator peeling mechanism SPR, a light source head LS, a light detection head LD, and a control mechanism CNT, as shown in FIG. 15.

The rotation stage STS holds the liquid crystal cell LCC. The stage ST holds a polarizing plate sheet member 7 that is the original member of the counter-substrate-side polarizing plate 82*a* and is formed of a laminated member of the counter-substrate-side polarizing plate 82*a* and the separator 6.

The rotation mechanism SP adjusts a position of the rotation stage STS holding the liquid crystal cell LCC and rotates in a direction indicated by arrow marks 92, the rotation mechanism SP having a configuration for adjusting a bonding angle of the counter-substrate-side polarizing plate 82*a* to the liquid crystal cell LCC for bonding. Thus, the rotation stage STS rotates in a direction indicated by arrow marks 93, the direction being the same as the direction indicated by the arrow marks 92.

The separator peeling mechanism SPR rotates in a direction indicated by an arrow mark 95, to thereby peel and remove the separator 6 from the polarizing plate sheet member 7.

The light source head LS and the light detection head LD are disposed so as to sandwich the counter-substrate-side polarizing plate 82*a* and the liquid crystal cell LCC in order to assess whether an optical axis of the counter-substrate-side polarizing plate 82*a* is located in a desired position with respect to an alignment axis of the liquid crystals of the liquid crystal cell LCC. The light emitted from the light source head LS is transmitted to the light detection head LD in a direction indicated by an arrow mark 94 through a through hole 91 formed in the rotation stage STS.

The control mechanism CNT controls the rotation mechanism SP such that the rotation mechanism SP moves to a position at a proper angle based on optical information, such as intensity information, read by the light detection head LD.

The polarizing plate bonding device performs the bonding operations in which first, the liquid crystal cell LCC is located and held on the rotation stage STS, and the polarizing plate sheet member 7 formed of the laminated member of the counter-substrate-side polarizing plate 82*a* and the separator 6 is located and held on the stage ST.

Next, as shown in FIG. 15, the separator peeling mechanism SPR included in the polarizing plate bonding device operates. While the separator 6 starts to be removed from the end portion of the polarizing plate sheet member 7, the light source head LS and the light detection head LD detect the intensity information of the light passing through both of the counter-substrate-side polarizing plate 82*a* and the liquid crystal cell LCC.

Then, the liquid crystal cell LCC is rotated by operating the rotation mechanism SP that adjusts the position of the rotation stage STS and rotates. The control mechanism CNT controls the rotation mechanism SP based on the intensity information read by the light detection head LD and completes the positioning of the rotation mechanism SP at the angle at which the intensity information read by the light detection head LD is a desired value, which is, for example, the lowest intensity in a range of the angles of the rotation movement of the liquid crystal cell LCC. The rotation movement of the liquid crystal cell LCC is then stopped.

Next, while the optical axis of the counter-substrate-side polarizing plate 82*a* when being bonded to the liquid crystal cell LCC has been located in the desired position, the stage ST on which the polarizing plate sheet member 7 is located moves, causing the end portion of the counter-substrate-side polarizing plate 82*a* to move to the position close to the edge of the liquid crystal cell LCC, more specifically, the predetermined bonding start position, as shown in FIG. 16, the separator 6 being removed from the counter-substrate-side polarizing plate 82*a* in the direction indicated by an arrow mark 96.

Next, a bonding roller RL closely contacts the surface of the end portion of the counter-substrate-side polarizing plate 82*a* close to the liquid crystal cell LCC described above. The bonding roller RL rotates in a direction indicated by an arrow mark 97, the direction being reverse to the rotation direction of the separator peeling mechanism SPR indicated by the arrow mark 95.

Subsequently, the rotation stage STS on which the liquid crystal cell LCC is located moves in a direction indicated by an arrow mark 98, causing the bonding roller RL to be pressed against the surface of the counter-substrate-side polarizing plate 82*a*. The counter-substrate-side polarizing plate 82*a* from which the separator 6 is removed is sequentially bonded to the liquid crystal cell LCC, particularly to the surface of the color filter substrate 70.

As a result, the counter-substrate-side polarizing plate 82*a* is bonded to the liquid crystal cell LCC while satisfying the desired position of the optical axis.

Figure 17:
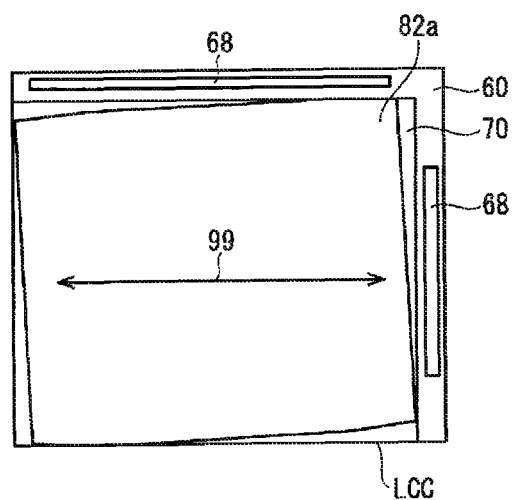
FIG. 17 is a diagram showing a configuration of a counter-substrate-side polarizing plate 82a at completion of the polarizing plate bonding step.

FIG. 17 is a diagram showing a configuration of the counter-substrate-side polarizing plate 82*a* at the completion of the polarizing plate bonding step. After the polarizing plate bonding step above, the counter-substrate-side polarizing plate 82*a* is tilted at the angle satisfying the desired position of the optical axis with respect to the liquid crystal cell LCC, and the counter-substrate-side polarizing plate 82*a* is bonded to the liquid crystal cell LCC, as shown in FIG. 17.

FIG. 17 shows the axis deviation angle of the counter-substrate-side polarizing plate 82*a*, the tilt angle of the counter-substrate-side polarizing plate 82*a* to the liquid crystal panel, and the chamfer angle of the counter-substrate-side polarizing plate 82*a* that are exaggerated by approximately several times for purposes of illustration.

In FIG. 17, an arrow with the reference numeral "99" indicates a direction of an absorption axis of the counter-substrate-side polarizing plate 82*a*.

The absorption axis of the counter-substrate-side polarizing plate 82*a* is tilted, for example, at +0.3°, namely, at 0.3° clockwise, with respect to an end face of the counter-substrate-side polarizing plate 82*a* around the midsection of the end face that is not subjected to chamfering.

However, the counter-substrate-side polarizing plate 82*a* is tilted in the reverse direction, which is at −0.3°, namely, at 0.3° counterclockwise, with respect to the liquid crystal cell LCC, and the counter-substrate-side polarizing plate 82*a* is bonded to the liquid crystal cell LCC. Therefore, it is clear that the absorption axis of the counter-substrate-side polarizing plate 82*a* is disposed in substantially parallel to the liquid crystal cell LCC, that is to say, the counter-substrate-side polarizing plate 82*a* is bonded in the optimum position. As a result, high quality display can be relatively easily obtained particularly in lateral electric field liquid crystal displays in which display quality such as contrast characteristics is susceptible to positions of optical axes.

As described above, to dispose the counter-substrate-side polarizing plate 82*a* and the liquid crystal cell LCC such that the axis direction of the counter-substrate-side polarizing plate 82*a* and the direction of the liquid crystal cell LCC have the optimum relationship, they are configured in the following manner. Although the counter-substrate-side polarizing plate 82*a* is bonded in the rotated position to the liquid crystal cell LCC, the original member of the counter-substrate-side polarizing plate 82*a* is used for the counter-substrate-side polarizing plate 82*a* in this preferred embodiment. The original member has the outer shape chamfered such that the corner portions have the predetermined shapes and is the octagon if made similarly to the first preferred embodiment. The chamfered shape is appropriately set while satisfying the relationships described in the first preferred embodiment. Therefore, the end portion of the counter-substrate-side polarizing plate 82*a* does not protrude from the edge of the outer shape of the panel of the liquid crystal cell LCC, and furthermore, the counter-substrate-side polarizing plate 82*a* can cover the region needed to be covered such as the display region 3 and the opening region formed in the housing correspondingly to the display region 3.

This preferred embodiment eliminates the need for another step of cutting the counter-substrate-side polarizing plate 82*a* that protrudes from the edge of the outer shape of the panel of the liquid crystal cell LCC particularly after the bonding step of the counter-substrate-side polarizing plate 82*a*.

The assessment of the direction of the axis deviation of the counter-substrate-side polarizing plate 82*a* and the process of cutting the unnecessary end portion of the counter-substrate-side polarizing plate 82*a* protruding from the edge of the outer shape of the panel of the liquid crystal cell LCC are intended to be performed in advance, for example, without using the present invention before the start of the polarizing plate bonding step, that is to say, in the state of the polarizing plate sheet member 7 formed of the laminated member of the counter-substrate-side polarizing plate 82*a* and the separator 6; however, it is difficult to accurately measure the optical axis of the counter-substrate-side polarizing plate 82*a* alone in the state of the laminated member of the counter-substrate-side polarizing plate 82*a* and the separator 6.

If the separator 6 is removed to assess the optical axis of the counter-substrate-side polarizing plate 82*a* before the start of the polarizing plate bonding step, a pasted surface of the counter-substrate-side polarizing plate 82*a* is exposed for a longer time, thereby reducing yields due to adhesion of foreign matter.

In contrast, in this preferred embodiment, the polarizing plate sheet member 7 formed of the laminated member of the counter-substrate-side polarizing plate 82*a* and the separator 6 has already been processed into the predetermined optimum shape. Subsequently, a series of peeling the separator 6, measuring the optical axis, adjusting the angle, and bonding can be performed in the polarizing plate bonding step or in the bonding device. This can increase the efficiency without adding unnecessary steps. Furthermore, the yields are not likely to be reduced, so that the relatively high yields can be achieved.

In the liquid crystal display and the method for manufacturing the liquid crystal display in this preferred embodiment described above, the effects below can be obtained even at occurrence of relatively great deviations of optical axes of polarizing plate sheet members for the counter-substrate-side polarizing plate 82*a* and the TFT-substrate-side polarizing plate 82*b* during manufacturing.

The bonding steps of the counter-substrate-side polarizing plate 82*a* and the TFT-substrate-side polarizing plate 82*b* in which the deviations of the optical axes are corrected can be performed while the end portion of the counter-substrate-side polarizing plate 82*a* does not protrude from the edge of the outer shape of the panel of the liquid crystal cell LCC, and furthermore, at least the counter-substrate-side polarizing plate 82*a* and the TFT-substrate-side polarizing plate 82*b* are disposed so as to respectively cover at least the display region 3 of the color filter substrate 70 and the TFT substrate 60.

Therefore, the effects of eliminating the waste of the polarizing plate sheet members in which the relatively great deviations of the optical axes occur, preventing low yields and low reliability of the liquid crystal display being manufactured, and furthermore, relatively easily obtaining high quality display at low manufacturing costs particularly in the lateral electric, field liquid crystal displays can be obtained all at once, the display quality such as the contrast characteristics being susceptible to the positions of the optical axes in the lateral electric field liquid crystal displays.

The liquid crystal display and the method for manufacturing the liquid crystal display in this preferred embodiment can be suitably used for not only polarizing plates including uniaxial polarizing plates and oval polarizing plates but also phase difference plates or viewing-angle correction (wide-view) films especially for optical films that need high accuracy of position for directions of optical axes (specific positions at bonding angles). Consequently, the effects such as improved display quality according to the degree of the accuracy of position needed for each of the optical films can be obtained similarly to the modifications of the polarizing plates of this preferred embodiment.

As for the technique for assessing the directions of the optical axes of the polarizing plate sheet members to preferably dispose the polarizing plate sheet members with respect to the liquid crystal cell LCC, this preferred embodiment described above shows the bonding technique for rotating and bonding the liquid crystal cell LCC at the desired angle with respect to the polarizing plate sheet members to be bonded. However, it is sufficient as long as the polarizing plate sheet members and the liquid crystal cell LCC can be bonded at the desired angles in the relative positions, so that the part holding the polarizing plate sheet members may be formed rotatable to adjust the angles thereof.

In cases where the optical axis of the liquid crystal cell LCC can be manufactured with high accuracy of position and the position of the optical axis of the liquid crystal cell LCC is separately measured and identified with accuracy, only the optical axes of the polarizing plate sheet members need to be accurately assessed. Therefore, for example, one reference optical film in which a direction of the optical axis is a predetermined direction is prepared, and a technique for assessing the degree of the axis deviation of the polarizing plate sheet member may be performed.

This preferred embodiment described above describes the example of the polarizing plate sheet member formed of the two members including the counter-substrate-side polarizing plate 82*a* and the separator 6 laminated to each other. To prevent scratch and adhesion of soil on the surface of the counter-substrate-side polarizing plate 82*a* opposite to the surface bonded to the separator 6, the polarizing plate bonding step is performed while protective films are laminated, and subsequently, the technique for peeling and removing the protective films before being housed in the housing may often be performed. Also in this preferred embodiment, polarizing plate sheet members including the protective films may be used.

In this case, the optical axis needs to be measured while the protective film and the counter-substrate-side polarizing plate 82a are laminated to each other. Thus, a technique for more accurately measuring the optical axis of the counter-substrate-side polarizing plate 82a is preferably selected as appropriate from among techniques for using a material having no optical axis, namely, a material being optically isotropic for the protective film, assessing the axis of the counter-substrate-side polarizing plate 82a while allowing for influences of the optical axis of the protective film, and measuring the protective film being partially or temporarily peeled In each of the preferred embodiments described above, the optical members are the polarizing plates, which are not limited thereto, and may be phase difference plates, for example.

In addition, according to the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display, comprising:
   a liquid crystal panel having a rectangular shape when seen from one side in a thickness direction; and
   an optical member that has a rectangular shape, has an optical axis, and is bonded to a surface on the one side or the other side in the thickness direction of said liquid crystal panel, wherein
   said optical member has a chamfered portion subjected to chamfering,
   said chamfering is C chamfering in which a chamfered shape of said chamfered portion is linear, and
   said chamfered shape is defined by x and y that satisfy relationships $$z = a \cdot \cos \theta_1 + b \cdot \sin \theta_1 - A_0 > 0 \quad (1)$$

$$x = z/\sin \theta_1 = (a \cdot \cos \theta_1 + b \cdot \sin \theta_1 - A_0)/\sin \theta_1 \quad (2)$$

$$y = z/\cos \theta_1 = (a \cdot \cos \theta_1 + b \cdot \sin \theta_1 - A_0)/\cos \theta_1 \quad (3)$$

where z represents an amount of protrusion of the optical member that is not chamfered from a bonded object, a represents half (½) a length of a short side of an outer shape of the optical member, b represents half (½) a length of a long side of the outer shape of the optical member, $\theta_1$ represents a rotation angle of the optical member, A0 represents half (½) a length of a short side of an outer shape of the bonded object, x represents a chamfer length of the long side of the outer shape of the optical member, and y represents a chamfer length of the short side of the outer shape of the optical member.

2. The liquid crystal display according to claim 1, wherein said liquid panel includes:
   a display region that has a rectangular shape and is used for display; and
   a frame region that surrounds said display region and is defined by Δ satisfying a relationship $$\Delta = A_1 \cdot \cos \theta_2 + B_1 \cdot \sin \theta_2 - A_1 \quad (4)$$

where $\theta_2$ represents a rotatable angle being a maximum value of an angle allowing for a rotation of the optical member, A1 represents half (½) a length of a short side of an outer shape of the display region, B1 represents half (½) a length of a long side of the outer shape of the display region, and Δ represents a distance between an edge of the outer shape of the optical member and the outer shape of the display region.

3. The liquid crystal display according to claim 2, wherein the rotation angle $\theta_1$ of the optical member is greater than 0 and less than or equal to said rotatable angle $\theta_2$ (0<$\theta_1$≤$\theta_2$).

4. The liquid crystal display according to claim 2, wherein the rotation angle $\theta_1$ of the optical member is equal to said rotatable angle $\theta_2$ ($\theta_1$=$\theta_2$).

5. The liquid crystal display according to claim 1, wherein said chamfered portion is formed in four corner portions of said optical member.

6. The liquid crystal display according to claim 1, wherein said chamfered portion is formed in two corner portions of said optical member.

7. The liquid crystal display according to claim 1, wherein said chamfered portion is formed in three corner portions of said optical member.

8. The liquid crystal display according to claim 1, wherein said chamfered portion is formed in one corner portion of said optical member.

9. The liquid crystal display according to claim 1, wherein said chamfered portion is formed on two surfaces of each of four corner portions of said optical member.

10. A method for manufacturing the liquid crystal display according to claim 1, comprising the steps of:
    preparing said optical member;
    assessing or measuring the optical axis of said optical member; and
    adjusting said rotation angle $\theta_1$ of said optical member based on information about said optical axis after said assessing or said measuring, and bonding said optical member to said liquid crystal panel.

11. The method for manufacturing the liquid crystal display according to claim 10, further comprising the step of peeling a separator laminated on said optical member between the step of preparing said optical member and the step of assessing or measuring the optical axis of said optical member.

* * * * *